United States Patent Office 3,418,074
Patented Dec. 24, 1968

3,418,074
PROCESS FOR CHLORINATING TITANIFEROUS ORES
Herb G. Sargeant, White Clay Creek Hundred, Del., assignor to E. I. du Pont de Nemours and Company, Wilmington, Del., a corporation of Delaware
No Drawing. Filed Nov. 17, 1965, Ser. No. 508,360
4 Claims. (Cl. 23—87)

ABSTRACT OF THE DISCLOSURE

An improvement in processes for chlorinating ferrotitaniferous ores in which (a) the particulate ore is subjected to contact with chlorine in a reaction zone at 800 to 1200° C., whereby a portion of the ore is chlorinated to titanium chloride and iron chloride vapors, (b) said vapors are withdrawn as a stream from the reaction zone together with suspended particulate solids containing soluble chlorides and insoluble, titanium-bearing residues, and (c) said withdrawn vapors are cooled to about from 60 to 180° C. and solids are separated therefrom, said improvement comprising the steps of (1) subjecting said separated solids to contact with a liquid solvent under high shear forces to extract soluble chlorides from the solids, and (2) recovering the remaining, insoluble, titanium-bearing residues for reuse in the chlorination reaction.

In processes for chlorinating iron-containing titaniferous ores, intermixed with a reducing agent in a fluidized bed and in some cases a static bed, a significant portion of unreacted ore leaves the furnace by entrainment with volatile chlorides. By cooling the gas stream containing the gaseous chlorides and unreacted ore particles to a point below the dew points of ferric chloride and ferrous chloride, the ore particles and iron chlorides can be separated as dry solids in a combination cyclone separator and spray condenser, as described, for example, in Kraus U.S. Patent 2,446,181. These solids, mostly iron chlorides and ore, are in processes of the present invention quenched in water and then agitated under high shear forces to dissolve soluble materials, leaving behind ore particles which can be dried and recycled back to the chlorination furnace for recovery of titanium values. This agitation and solution step is performed in a unique series of hydroclones (wet cyclones) connected through eductors wherein the solid particles in the slurry are extracted, washed, and separated in a single step.

Although many patents deal with chlorinating ferrotitaniferous ores in fluidized and static bed reactors, and several are particularly concerned with solving the problems encountered while purifying the chlorination gases, none of these patents mentions recycling the "furnace blowover"—that is, the vapor-borne solids in the effluent stream from the chlorination reaction zone. In some methods for condensing iron chlorides from the furnace chlorination gases, a slurry of $TiCl_4$ containing $FeCl_2$ and $FeCl_3$ is formed—see U.S. Patents 2,446,181; 2,718,279; 2,815,091; and 2,870,869. The combination spray condenser and cyclone separator described in Kraus U.S. Patent 2,446,181 is of particular interest since in it unreacted ore drops out of the system with the iron chlorides as a relatively dry powder with a minor amount of $TiCl_4$, thus providing a suitable mixture for further treatment according to the invention.

In Krchma U.S. Patent 2,701,180 portions of the bed are periodically removed and leached to remove soluble, nonvolatile alkali and alkaline earth chlorides from unreacted ingredients to be returned to the chlorination furnace. The present invention is restricted to leaching only the blowover solids.

Various way to remove solids from chloroination gas such as hot cyclone separators and centrifuges have been proposed, but the solids emitted in these schemes contain iron chlorides and are therefore unsuited for recirculation to the chlorination furnace.

It is, therefore, an object of the invention to provide a way to increase the yield of $TiCl_4$ in processes for chlorination of ferrotitaniferous ores. Another object is to provide processes for recovery and recirculation of unreacted titanium-bearing ores from such chlorination reactions. A further object is to provide improved processes for separating iron chlorides and unreacted carbon from unreacted ore particles in chlorination blowover solids. Other objects will appear hereinbelow.

Titaniferous ores used as raw materials in producing $TiCl_4$ usually contain numerous other metallic constituents, the major one being iron. In most commercial ilmenites, a principal supply of titanium, the iron content lies between 20 and 40 percent while the $TiO_2$ content is between 30 and 65 percent. Rutile ore, another chief source, is nearly all $TiO_2$, this constituent being 90–97 percent of the total.

In chlorinating these materials to produce $TiCl_4$, a mixture of coke and ore is brought into contact with chlorine at 700–1200° C. This process can be carried out continuously by feeding coke and ore into a static or fluidized bed reactor. Under optimum operating conditions nearly everything in the ore is converted to volatile chlorides or oxychlorides, but under operating conditions, which are less than optimum but still practical and economic especially in a fluid-bed reactor, some unreacted dust is entrained in the chlorination gases. This dust comprises mostly small ore particles and coke. For fluidized beds operating satisfactorily the blowover ore amounts to about 5–10 percent of the ore charged and quite often more.

In processing chlorination gases containing vaporous $TiCl_4$, $FeCl_3$, $FeCl_2$, indigenous chlorides and solid-state coke dust, ore, gangue and $TiO_2$, many approaches have been developed. A composite of these steps and processes are as follows: (1) Particulate coke and ore materials can be removed from hot chloride vapors at temperatures above their dew point by filtration, centrifugation, or by cyclone separating. (2) If particulate solids are not thus separated they can be removed with the solid iron chlorides at temperatures below the dew point of ferric chloride. Hot vapors are cooled in flues, or by spray condensers using cold $TiCl_4$. Coke dust, ore and iron chlorides can be discharged as a dry powder when spray condensing schemes are employed. Several cyclone or filter stages may be needed to remove iron chlorides. (3) Having removed solids and iron chlorides the $TiCl_4$ is finally purified by distillation to remove traces of oxides of vanadium, aluminum, etc. All operations are conducted in inert atmospheres in enclosed vessels to prevent the hydrolysis of $TiCl_4$.

It has been the normal practice to discard unreacted ore along with iron chlorides since heretofore economical schemes for separating ore from such chlorides and coke had not been worked out. By this invention the iron chlorides and soluble chlorides which are separated from $TiCl_4$ during purification can be washed away from unreacted ore, gangue, and $TiO_2$ blowover with water. In the practice of the invention a titaniferous ore is fed to a furnace along with coke in stoichiometric quantities, taking into account the oxygen present in the ore. Chlorination is carried out at about 800–1200° C. and preferably at less than 1000°, with excess chlorine. Hot volatile chlorides evolve at 800–975° C. into coolers and separating devices and condensers.

In a preferred separation and purification operation, the temperature of the furnace effluent gas is lowered to about 500° C. in water-cooled flues and quenched by direct contact with cold liquid $TiCl_4$ in spray or wet-walled condensers, whereby the temperature of the gas and entrained solid is lowered below the dew point of iron chlorides but remains above the dew point of $TiCl_4$. At 10 and 3 volume percent $Fe_2Cl_6$ where the $TiCl_4$ volume percent is 33 and 10, respectively, the remaining gases being noncondensible, the dew points are 270° C. and 250° C. in the case of ferric chloride and 100° C. and 65° C., respectively, in the case of $TiCl_4$. The atmospheric boiling points for these materials are 315° C. and 136° C. for ferric chloride and $TiCl_4$, respectively.

Inert silicates, coke, iron chlorides, leave the gas stream with unchlorinated, titanium-containing sand and are discharged at the bottom of the spray condenser with some $TiCl_4$. About 99 percent of the solids present are discharged at this point. The titanium sand is enriched in $TiO_2$ because of the preferential chlorination of the iron in the virgin ore.

The solids are dropped into a corrosion-resistant vessel containing water to form an aqueous slurry. The slurry is mixed with water in the surge tank until the solids contents is in the range of from about 0.08 to 3.0 percent by weight. The slurry pH due to HCl formed on hydrolysis of the metal chlorides will vary according to the amount of iron in the ore, but is usually at about 0.5 when ilmenite is chlorinated. This slurry, containing dissolved iron chlorides and unreacted ore sand, is drained to an intermediate surge tank wherefrom it is pumped to a system of wet cyclone separators herein sometimes referred to as hydroclones.

Solids in the slurry are agitated by the turbulence of the slurry passing through the pipe and by the high shear forces in the cyclone separators, where the combined forces of gravity and centrifugal action of the slurry cause the heavier particles of ore to drop out while the light particles of coke and the dissolved chlorides pass up and out of the top of the hydroclones to disposal.

Use of hydroclones in processes of the present invention for the dual purpose of washing out soluble chlorides and dropping out heavier, titanium-containing solid particles is unique. The manner of using the wet cyclones is also novel in that the energy needed to convey the solids and achieve the separation is provided by venturi jet aspirators or "eductors" which are used to pull out the underflow from one hydroclone and sweep the heavier material into the next hydroclone with fresh water. This operation is repeated several times, with the freshly settled solids being swept into the succeeding cyclone with fresh water.

By adding caustic soda or ammonia to one or more of the hydroclones the small quantity of acid remaining after the fifth, sixth or seventh washing is adjusted to a pH in the range of 7–8. Automatic equipment can be used to hold the pH in this range. The iron chloride-free ore is placed in a flotation chamber where any light coke particles remaining are decanted away from the ore; the ore is pumped out of the bottom tank as a slurry containing 20–50 percent solids. This slurry is dewatered by known techniques. The dewatered ore dust is usually placed in a drier with virgin ore and returned to the furnace for further chlorination.

Prior to this invention, the major problem in washing the acid from the furnace blowover solids was the inability to wash the acid from the interstices between the agglomerated silica and ilmenite particles. When the slurry is washed in a counter-current column, or a box, much of the acid is not removed. After drying, the agglomerates break down during handling, and when they are resubjected to moisture, the acid becomes active and causes high corrosion rates on mild steel equipment such as elevators, chutes, and bins. In processes of this invention, these agglomerates are alternately subjected to extremely high shear forces in the hydroclones and washed with fresh water in the eductors until the majority of the acid is eliminated. Intimate contact between fresh water and the entire surface of each particle is attained. The hydroclones also act as conventional gravity separators, valuable solids being discharged from the bottom and the waste effluent discharged from the top. Thus the use of the hydroclones is doubly advantageous.

The eductors conventionally pull material into their centers by vacuum and discharge it out the end. In processes of this invention they perform this function, but also two others:

(a) The water dissolves the acid from the fresh particle surfaces formed in the hydroclone, and (b) The water pressure provides the energy to move the slurry from one hydroclone to the next in the series.

Thus, the only energy source required is the water energy. This energy is imparted by a pump working on the water fed to the eductor, a relatively non-corrosive and non-abrasive liquid. Pumps working on $FeCl_3$-solid slurries, by contrast, abrade and corrode out in very short time, even though rubber-lined. By making possible the use of eductors to feed the corrosive- and abrasive-ore slurry to the washing system the processes of this invention greatly reduce maintenance costs. If eductors are not used, a pump is required for each hydroclone stage, thus greatly increasing replacement costs because of the very high abrasion and corrosion rates.

Processes of the present invention have the further important advantage that a relatively small quantity of water is required per unit of solids washed. For instance, it was calculated from laboratory data that 140,000 pounds of water would be required to dilute the acid in a pound of washed solids from a pH of 0.1 to 6.0. In contrast, in a process of this invention there was required about 40 pounds of water per pound of washed solids. A counter-current flow system, box or a column, is inefficient because the fresh water channels around large sections of solids, and thus much more than 40 pounds of water would be required to wash a pound of solids even if it were possible to wash thoroughly by this method.

The invention will be better understood by reference to the following illustrative example:

A chlorination furnace operating at 900–1000° and being fed 31 parts mixed ilmenite and rutile ore (70% $TiO_2$, 28% iron oxides, the rest being indigenous minerals), 7 parts coke, and 50 parts chlorine gas produced a mixture, upon quenching with 10 parts liquid $TiCl_4$, containing: 0.2 part $Cl_2$, 1 part HCl, 14 parts $CO_2$, 2 parts CO, 60 parts $TiCl_4$, 15 parts $FeCl_3$ and $FeCl_2$ combined, 2.0 parts miscellaneous chlorides, 1.0 part blowover coke dust, and 2.2 parts blowover ore. This gas and solid stream was cooled to 525° C. in a water-cooled flue, then further cooled to 180° C. by quenching with cold, liquid $TiCl_4$ in a combination $TiCl_4$ spray condenser and cyclone separator.

From the bottom of the spray condenser was discharged 20.8 parts of particulate solids containing 1 part $TiCl_4$, 14.8 parts iron chlorides, 1.8 parts miscellaneous chlorides, 1 part blowover coke, and 2.2 parts blowover ore. This material was quenched continuously in a tank with water and being drained into a surge tank where additional water was added to hold the solid content of the slurry at 0.08–3.0%. A pump was used to move the slurry from the surge tank to a series of hydroclones. The first of these hydroclones was 14″ in diameter and was followed in series by six 8″ diameter cyclones operating under pressures of at least 12–15 lbs. per square inch gauge at the inlet side and preferably at 20 lbs. per square inch gauge. Water passing into the jet eductors at 45 p.s.i.g. to each eductor was used to aspirate the ore being washed, from the bottom of each hydroclone into the succeeding hydroclone in the series. A total of 7 washings and 6 aspirations were performed in sequence on a continuous basis. After 6 of the washings, ammonia gas was fed into the ore slurry to insure neutralization of the slurry. This was done by a pH-controlled vave in the line.

After soluble chloride salts were removed from the top of the hydroclones and disposed of, the light coke particles were removed by flotation from an overflow tank. The bottoms from this tank were dewatered in a Denver-type dewatering cone by pumping the solids from the bottom of the wash tank. The recovered, dewatered ore contained about 20 percent moisture. This moisture was removed by mixing the dewatered ore with new ore and passing the mixture through a drier into a chlorination furnace. Recovery of Ti from ore by this method of operation amounted to 99.3 percent of available values.

Although in the foregoing discussion the use of hydroclones in the extraction process is emphasized, as is the use of eductors for moving the slurry between hydroclones, it should be understood that the invention is not restricted by the apparatus used in accomplishing the separation. The invention requires that the iron chloride-titanium tetrachloride-ore mixture be contacted with a liquid media which solubilizes chlorides and leaves the insoluble ore behind for drying and rechlorination. Many methods can be used to accomplish this separation. Those skilled in the art will readily recognize that slurry tanks, followed by filtration and dewatering devices of various designs, can be used in place of the preferred hydroclones. Other liquids, such as aqueous bases and weak acids, can be used in place of fresh water.

Furthermore, the procedure can be employed in schemes where similar extractions are desired from other materials using similar equipment.

I claim:

1. In a process for chlorinating ferrotitaniferous ores in which (a) the particulate ore is subjected to contact with chlorine in a reaction zone at 800 to 1200° C., whereby a portion of the ore is chlorinated to titanium chloride and iron chloride vapors, (b) said vapors are withdrawn as a stream from the reaction zone together with suspended particulate solids containing soluble chlorides and insoluble, titanium-bearing residues, and (c) said withdrawn vapors are cooled to about from 60 to 180° C. and solids are separated therefrom, the improvement which comprises (1) subjecting said separated solids to contact with a liquid solvent under high shear forces to extract soluble chlorides from the solids, (2) recovering the remaining, insoluble, titanium-bearing residues, and (3) reusing them in the chlorination reaction.

2. In a process for recovering titanium values from a solid particulate material containing carbonaceous particles and heavier ore particles, carried out of a high temperature titaniferous ore chlorination process in a stream of titanium tetrachloride vapor, in which process said stream is quenched to below 300° C. to condense the normally solid chlorides, including iron chloride, to the solid state and said titanium tetrachloride vapor is separated from the condensed solids as well as the solids contained in the initial hot stream, the improvement which comprises: (1) leaching soluble chlorides from said solids by high shear contact with water, (2) separating the carbonaceous particles from the heavy ore particles by sedimentation in said water, (3) separating the heavy ore particles from the water and iron chloride dissolved therein, (4) neutralizing acid present in the separated heavy solids slurry, (5) dewatering said heavy solids, (6) drying said heavy solids and (7) recycling them to the chlorination step for recovery of the contained titanium values as titanium tetrachloride.

3. A process of claim 2 wherein the leaching step is repeated in series to wash most of the soluble chlorides out of the heavy particle slurry prior to the neutralization step.

4. The process of claim 3 wherein energy for the high shear forces is imparted to the heavy solids slurry by the injection of increments of fresh water between the succeeding high shear leaching steps in a direction co-current with a flow of said heavy solid slurry.

References Cited

UNITED STATES PATENTS

| | | | |
|---|---|---|---|
| 2,580,635 | 1/1952 | Winter | 23—87 XR |
| 2,675,889 | 4/1954 | Frey | 23—87 XR |
| 2,815,091 | 12/1957 | Mas et al. | 23—87 XR |
| 2,849,983 | 8/1958 | Nelson et al. | 23—87 XR |
| 2,953,218 | 9/1960 | Coates | 23—87 XR |
| 3,097,952 | 7/1963 | Bresette | 23—89 XR |
| 3,359,065 | 12/1967 | Zirngibl et al. | 23—87 |

OTHER REFERENCES

Chemical Engineers' Handbook, by John H. Perry, 3rd ed. (1950), McGraw-Hill Book Co., New York.

EARL C. THOMAS, Primary Examiner.

EDWARD STERN, Assistant Examiner.

U.S. Cl. X.R.

23—202, 271, 312; 75—1, 112